United States Patent

[19]

Takahashi et al.

[11] Patent Number: 5,928,778
[45] Date of Patent: Jul. 27, 1999

[54] DECORATIVE MATERIAL HAVING ABRASION RESISTANCE

[75] Inventors: Kazuhiro Takahashi; Toshitake Kobayashi; Masataka Takemoto; Takashi Matano; Haruo Ono, all of Tokyo-To, Japan

[73] Assignee: Dai Nippon Printing Co., Ltd., Japan

[21] Appl. No.: 08/666,407

[22] PCT Filed: Oct. 31, 1995

[86] PCT No.: PCT/JP95/02230

§ 371 Date: Aug. 29, 1996

§ 102(e) Date: Aug. 29, 1996

[87] PCT Pub. No.: WO96/13381

PCT Pub. Date: May 9, 1996

[30] Foreign Application Priority Data

Oct. 31, 1994 [JP] Japan .................................. 6-290706
Jun. 1, 1995 [JP] Japan .................................. 7-158591

[51] Int. Cl.⁶ .............................. B32B 5/16; B32B 27/00
[52] U.S. Cl. .................... 428/323; 428/423.1; 428/908.8
[58] Field of Search ..................... 428/329, 328, 428/327, 908.8, 323, 141, 143, 423.1

[56] References Cited

U.S. PATENT DOCUMENTS

| | | | |
|---|---|---|---|
| 4,255,480 | 3/1981 | Scher et al. ........................ | 428/208 |
| 4,263,081 | 4/1981 | Scher et al. ........................ | 156/279 |
| 4,430,375 | 2/1984 | Scher et al. ........................ | 428/148 |
| 4,853,276 | 8/1989 | Kurushima ......................... | 428/187 |
| 4,971,855 | 11/1990 | Lex et al. .......................... | 428/206 |
| 5,344,704 | 9/1994 | O'Dell et al. ...................... | 428/323 |
| 5,545,476 | 8/1996 | O'Dell et al. ...................... | 428/327 |

FOREIGN PATENT DOCUMENTS

| | | |
|---|---|---|
| 61-44963 | 3/1986 | Japan . |
| 1-172801 | 7/1989 | Japan . |

*Primary Examiner*—Paul Thibodeau
*Assistant Examiner*—Holly C. Rickman
*Attorney, Agent, or Firm*—Parkhurst & Wendel, L.L.P.

[57] ABSTRACT

A decorative material including a substrate and an abrasion-resistant coating layer formed thereon. The abrasion-resistant coating layer includes spherical particles (A) having an average particle diameter of 3 to 50 micrometers, and a binder (B) including crosslinkable resins. The amount of the spherical particles (A) is from 5% to 50% by weight of the total amount of the components (A) and (B). The hardness of the spherical particles (A) is higher than that of the binder (B). The average particle diameter d (micrometers) of the spherical particles (A) fulfills the following inequality (1):

$$0.3t \leq d \leq 3.0t \qquad (1)$$

wherein "t" is an average thickness (micrometers) of the coating layer. Thus, the relationship between the average thickness of the coating layer and the average particle diameter of the spherical particles is strictly controlled so that a decorative material which is excellent in both flexibility and abrasion resistance (scratch resistance) can be successfully obtained.

1 Claim, No Drawings

DECORATIVE MATERIAL HAVING ABRASION RESISTANCE

TECHNICAL FIELD

The present invention relates to a decorative material whose surface is excellent in scratch resistance. More specifically, the present invention relates to a decorative laminate obtainable by covering the surface of paper or plastic sheet or film, or the printed surface thereof, with a coating layer excellent in both abrasion resistance and flexibility.

BACKGROUND OF THE INVENTION

Heretofore, reactive resins such as thermosetting resins or ionizing-radiation-curing resins have been used as overcoat materials to cover the surface of paper or plastic sheet or film, or the printed surface thereof so as to protect such a material from damage by abrasion or scratch.

In order to successfully protect the above-described materials from damage by abrasion or scratch, it is necessary to make a resin to be used for coating the materials harder. In order to attain this, it has been necessary to lower the average molecular weight of crosslinked molecules of the resin. Consequently, however, the flexibility of the resin itself is lowered, so that the resin layer tends to be cracked when the substrate is bent.

DISCLOSURE OF THE INVENTION

We studied overcoat materials capable of forming films which are hardly damaged by scratch and which have flexibility. As a result, it was found that although a coating layer formed by using a composition containing reactive resins to which a predetermined amount of spherical particles having a specific average particle diameter are added can show the desired effects to a certain extent, such a coating layer is still unsatisfactory. It was also found that it is necessary to further specify the relationship between the average thickness of the coating layer and the average particle diameter of the spherical particles and that a decorative laminate excellent in both flexibility and abrasion resistance can be obtained by strictly controlling this relationship. The present invention has been accomplished on the basis of the above findings.

Namely, a decorative material according to the present invention comprises a substrate and an abrasion-resistant coating layer formed thereon, and is characterized in that the abrasion-resistant coating layer comprises spherical particles (A) having an average particle diameter of 3 to 50 micrometers, and a binder (B) comprising crosslinkable resins, that the amount of the spherical particles (A) is from 5% to 50% by weight of the total amount of the components (A) and (B), that the hardness of the spherical particles (A) is higher than that of the binder (B), and that the average particle diameter d (micrometers) of the spherical particles (A) fulfills the following inequality (1):

$$0.3t \leq d \leq 3.0t \qquad (1)$$

wherein "t" is an average thickness (micrometers) of the coating layer.

BEST MODE FOR CARRYING OUT THE INVENTION Substrate

In the present invention, paper, plastic film or sheet, metallic foil or plate, or the like can be used as the substrate depending on the purpose. Although either a sheet-like material such as paper, plastic sheet or nonwoven fabric, or a board-like material such as metallic plate, woodboard or plastic board can be used as the substrate, it is preferable to use a sheet of a flexible material. This is because it is possible to continuously produce a decorative material when a roll of such a substrate sheet is used in the production process.

In general, in the case where a sheet-like material is used as the substrate, the thickness thereof is preferably from 5 to 200 micrometers. Further, it is also possible to use, as the substrate, a sheet having a rough surface or a three-dimensional pattern.

Specific examples of the paper which can be used as the substrate include tissue, craft paper, titanium paper, linter paper, cardboard, plasterboard paper, raw fabric of so-called vinyl wall paper obtained by applying polyvinyl chloride resin to paper by means of sol coating or dry lamination, high-grade paper, coated paper, art paper, vegetable parchment, glassine paper, animal parchment, paraffin paper and Japanese paper. In addition, a paper-like sheet can also be used as the substrate. Examples of the paper-like sheet include woven or nonwoven fabrics produced by using inorganic fibers such as glass fiber, asbestos, potassium titanate fiber, alumina fiber, silica fiber and carbon fiber, or organic resins such as polyester and Vinylon.

Examples of the plastic sheet which can be used as the substrate include single layers or composites of films or sheets of synthetic resins, for instance, polyolefin resins such as polyethylene, polypropylene and polymethylpentene, vinyl resins such as polyvinyl chloride, polyvinylidene chloride, polyvinyl alcohol, vinyl chloride-vinyl acetate copolymer, ethylene-vinyl acetate copolymer, ethylene-vinyl alcohol copolymer and Vinylon, polyester resins such as polyethylene terephthalate, polybutylene terephthalate and polyethylene naphthalate-isophthalate copolymer, acrylic resins such as polymethyl methacrylate, polyethyl methacrylate, polyethyl acrylate and polybutyl acrylate, polyamides such as nylon 6 and nylon 66, cellulose resins such as cellulose triacetate and cellophane, polystyrene, polycarbonate, polyallylate and polyimide. Further, examples of the metal which is used as metallic foil include aluminum, stainless steel, iron and copper.

Examples of the board which can be used as the substrate include woodboards such as veneer, plywood, particle board and MDF (medium density fiber board), plaster-type boards such as plaster and plaster slug boards, cement boards such as calcium silicate, asbestos slate, light-weight expanded concrete and blow-extruded cement boards, fiber-cement boards such as pulp-cement, asbestos-cement and wood-chip-cement boards, ceramic boards such as earthenware, porcelain, stoneware, terra-cotta, glass and enameled ware boards, metallic plates such as iron, zinc-plated steel, polyvinyl-chloride-sol-coated steel, aluminum and copper plates, thermoplastic resin boards such as polyolefin resin, acrylic resin, ABS and polycarbonate boards, thermosetting resin boards such as phenolic resin, urea resin, unsaturated polyester, polyurethane resin, epoxy resin and melamine resin boards, and other resin boards, for instance, so-called FRP boards which are obtained by impregnating various fibrous substrates such as nonwoven fabric of glass fiber, cloth and paper, with a resin such as phenolic, urea, unsaturated polyester, polyurethane, epoxy, melamine or diallyl phthalate resin.

It is also possible to use, as the substrate, a composite substrate which can be obtained by laminating two or more of the above-mentioned various substrates by any known means, for instance, by the use of an adhesive agent, or by effecting thermal fusion.

Spherical Particles

The spherical particles (A) for use in the present invention are particles in the shape of a sphere or of one similar to it. Preferable examples of the spherical particles include fused alumina, alumina produced by the Bayer process, zirconia, titania, and eutectic mixtures thereof, which have a Knoop hardness of 1,300 kg/mm² or more. Of these, those spherical particles which have a Knoop hardness of 1,800 kg/mm² or more are preferred, and fused alumina can be mentioned as a specific example of such particles.

The "Knoop hardness" as used herein is an indentation microhardness measured by using a Knoop indenter; it is a value obtained by dividing the applied load with which a rhombic indentation is formed on the surface of a sample, by the projected area of the indentation computed from the long diagonal of the permanent indentation. The method for measuring the Knoop hardness is described in ASTM C-849. As a method for shaping inorganic particles into spherical ones, it is possible to apply a method in which the above-described inorganic material in an indeterminate form is ground, and melted in a high-temperature oven at a temperature above the melting point thereof, thereby obtaining spherical particles by utilizing the surface tension; or a method in which the above-described inorganic material is melted at a high temperature above the melting point thereof, and the melt is sprayed to obtain spherical particles.

The content of the spherical particles in a composition used for forming the abrasion-resistant coating layer of the present invention is generally from 5 to 50% by weight, preferably from 10 to 40% by weight.

When the content of the spherical particles is less than 5% by weight, the scratch resistance of the coating layer is insufficient. On the other hand, when the content of the spherical particles is more than 50% by weight, the binder effects of the crosslinkable resins cannot be fully obtained, and the coating layer has lowered flexibility.

The average particle diameter of the spherical particles is, in general, from 3 to 50 micrometers, preferably from 8 to 40 micrometers. When spherical particles having an average particle diameter of less than 3 micrometers are used, an opaque coating layer is obtained, so that such an average particle diameter is unfavorable. On the other hand, the average particle diameter of more than 50 micrometers is much larger than the thickness of a coating layer formed by using a typical coating composition. The surface smoothness of the coating layer is thus impaired.

When the composition of the present invention is coated onto the substrate, the thickness of the resulting coating layer and the above-described average particle diameter d are required to fulfill the following inequality (1):

$$0.3t \leq d \leq 3.0t \tag{1}$$

wherein "t" is an average thickness (micrometers) of the coating layer.

When the average particle diameter is in excess of 3.0 t, the particles protrude from the surface of the coating layer, so that the coating layer has a poor appearance. On the other hand, when the average particle diameter is less than 0.3 t, the coating layer has impaired scratch resistance, so that such an average particle diameter is unfavorable.

With respect to the spherical particles, more specific explanation will be given below.

It is enough for the spherical particles to have smooth curved surfaces, like perfectly-round particles, elliptical particles obtainable by flattening round particles, and particles which are similar to perfectly-round or elliptical particles in shape. The spherical particles are preferably those which have neither projection nor edge on the surfaces thereof, that is, so-called cutting-edge free particles. The spherical particles can greatly improve the abrasion resistance of the surface resin layer itself, as compared with particles in an indeterminate form made of the same material, and, at the same time, produce the following characteristic effects: the spherical particles do not wear a coating applicator used; the hardened coating layer also does not wear those things which are brought into contact with the coating layer; and the coating layer has improved transparency. These effects are particularly obtained when the spherical particles have no cutting edge.

It is preferable that the hardness of the material used for producing such spherical particles be higher than that of the crosslinkable resin, which will be described later, to be used. Particles of either an inorganic or organic resin can be used. The hardness of the spherical particles and that of the crosslinkable resin can be determined by means of the Mohs hardness test, the Vickers hardness test or the like. For example, when these hardnesses are expressed in Mohs scale, it is preferable that the difference between these hardnesses be 1 or more. The "Mohs hardness" as used herein is based on the conventional definition of the Mohs hardness, that is, the value obtained by comparison with the following ten selected minerals:

1: talc; 2: gypsum; 3: calcite; 4: fluorite; 5: apatite; 6: orthoclase; 7: quartz; 8: topaz; 9: corundum; and 10: diamond.

Specifically, particles of an inorganic material such as alpha-alumina, silica, chromium oxide, iron oxide, diamond or graphite, or organic resin particles, for instance, beads of a synthetic resin such as crosslinked acrylic resin can be used as the spherical particles. Particularly preferable spherical particles are spherical alpha-alumina particles. This is because alpha-alumina has an extremely high hardness and can impart high abrasion resistance to the resulting coating layer, and because alpha-alumina which is spherical in shape is readily obtainable.

Spherical alpha-alumina with decreased cutting edges can be obtained, as described in Japanese Laid-Open Patent Publication No. 55269/1990, by adding a small amount of a hardener or crystallizing agent such as alumina hydrate, a halide or boron compound to fused or sintered alumina which has been ground, and thermally treating the mixture at a temperature of 1,400° C. or higher for two hours or longer. Spherical aluminas of this type, having various average particle diameters are commercially available under the trademark of "Spherical Alumina AS-10, AS-20, AS-30, AS-40 and AS-50" from Showa Denko K.K.

The spherical particles can be subjected to surface treatment. For instance, when the spherical particles are treated with a fatty acid such as stearic acid, the dispersibility of the particles is improved. Further, when the spherical particles are surface-treated with a silane coupling agent, the adhesion between the particles and the crosslinkable resin used as the binder, and the dispersibility of the particles in the coating composition are improved. Examples of the silane coupling agent include alkoxysilanes containing in the molecules thereof a radically-polymerizable unsaturated bond such as vinyl or methacryl, and alkoxysilanes containing in the molecules thereof a functional group such as epoxy, amino or mercapto. It is preferable to suitably select the type of the radically-polymerizable unsaturated bond or functional group contained in the silane coupling agent, depending on the type of the crosslinkable resin which is used along with the spherical particles. For example, in the case where an ionizing-radiation-curing resin such as (meth)acrylate is used as the crosslinkable resin, an alkoxysilane having a radically-polymerizable unsaturated bond is used; and when a two-pack hardening urethane resin is used, an alkoxysilane having epoxy or amino group is used. Specific examples of the alkoxysilanes include those which contain in the molecules thereof a radically-polymerizable unsaturated bond, such as gamma-methacryloxypropyl trimethoxysilane, gamma-methacryloxy-propylmethyl dimethoxysilane, gamma-methacryloxypropyldimethyl methoxysilane, gamma-methacryloxypropyldimethyl ethoxysilane, gamma-acryloxypropyl trimethoxysilane, gamma-acryloxypropylmethyl dimethoxysilane, gamma-acryloxypropyldimethyl methoxysilane, gamma-acryloxypropyl triethoxysilane, gamma-acryloxypropylmethyl diethoxysilane, gamma-acryloxypropyldimethyl ethoxysilane and vinyl triethoxysilane; and those which contain in the molecules thereof a functional group such as epoxy, amino or mercapto.

There is no particular limitation on the method for surface-treating the spherical particles by using a silane coupling agent, and any conventionally known method can be adopted. Examples of such a method include a dry method in which a predetermined amount of a silane coupling agent is sprayed over the spherical particles with vigorous stirring; and a wet method in which after the spherical particles are dispersed in a solvent such as toluene, a predetermined amount of a silane coupling agent is added to the dispersion to allow to react the particles with the coupling agent. The preferable amount (the amount required) of the silane coupling agent to be used for treating the spherical particles is such that the minimum area of the spherical particles covered with the silane coupling agent can be 10 or more for 100 of the specific surface area of the spherical particles. It is not so effective to use a silane coupling agent in such an amount that the minimum area of the spherical particles covered with the silane coupling agent becomes less than 10 for 100 of the specific surface area of the spherical particles.

Binder

A thermosetting resin or an ionizing-radiation-curing resin can be used as the crosslinkable resin (reactive resin) to be comprised in the binder (B) for use in the present invention.

A conventionally known thermosetting resin can be used for the binder. Examples of such a resin include two-pack urethane, epoxy, alkyd and unsaturated polyester resins.

Examples of the two-pack urethane resin include those which are obtained by blending a first liquid comprising such a polyol compound that contains in the molecular structure thereof at least two hydroxyl groups on the average, with a second liquid comprising a polyisocyanate compound so that the equivalent ratio of the hydroxyl groups to the isocyanate groups will be from 0.7 to 1.5.

Examples of the above-mentioned epoxy resin include those which are obtained by blending an epoxy resin containing in the molecular structure thereof at least two epoxy groups on the average, with a mono- or polyamine containing in one molecule thereof at least three active hydrogens which can react with the epoxy groups so that the equivalent ratio of the epoxy groups in the epoxy resin to the active hydrogens in the mono- or polyamine will be from 0.7 to 1.5.

There can be mentioned, as the ionizing-radiation-curing resin used as the binder component, those compounds which contain in the molecular structure thereof one or more radically-polymerizable double bonds. Specific examples of such compounds include unsaturated polyester resin, compounds having (meth)acryloyl group [monofunctional (meth)acrylate, polyfunctional (meth)acrylate, urethane (meth)acrylate, polyester (meth)acrylate, epoxy (meth) acrylate, etc.], vinyl compounds [styrene, divinylbenzene, etc.], allyl compounds [diallylphthalate, etc.], and mixtures of two or more of these compounds.

The ionizing-radiation-curing resin is more preferable as the binder resin for use in the present invention, and a polyether urethane (meth)acrylate represented by the following general formula (2) is particularly preferred:

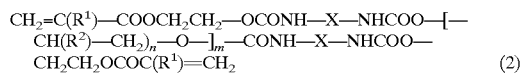

$$CH_2=C(R^1)-COOCH_2CH_2-OCONH-X-NHCOO-[-CH(R^2)-CH_2)_n-O-]_m-CONH-X-NHCOO-CH_2CH_2OCOC(R^1)=CH_2 \quad (2)$$

wherein $R^1$ and $R^2$ each represent hydrogen or methyl group, X is diisocyanate radical, n is an integer of 1 to 3, and m is an integer of 6 to 60.

A conventionally known diisocyanate can be used for preparing the above polyether urethane (meth)acrylate. Specific examples of the diisocyanate include isophorone diisocyanate, dicyclohexylmethane diisocyanate, hexamethylene diisocyanate, diphenylmethane diisocyanate and tolylene diisocyanate.

Examples of the polyether diol used for preparing the above polyether urethane (meth)acrylate include polyoxypropylene glycol, polyoxyethylene glycol and polyoxytetramethylene glycol, having a molecular weight of 500 to 3,000.

In the case where the polyether urethane (meth)acrylate represented by the above general formula (2) is used as the binder, the amount thereof is preferably 10% by weight or more of the total weight of the binder. When less than 10% by weight of this resin is used, the binder resin itself has lowered flexibility, so that the resulting coating layer tends to be cracked when the substrate is bent.

To cure the composition of the present invention by the irradiation of ionizing radiation, ultraviolet rays or electron beam can be used as the ionizing radiation.

In the case where the curing of the composition of the present invention is effected by using ultraviolet rays, a conventionally known ultraviolet irradiator equipped with a high-pressure mercury vapor lamp, a metallic halide lamp or the like can be used.

The irradiance of ultraviolet rays for curing the composition of the present invention is preferably from 50 to 1,000 mJ/cm². When the irradiance of ultraviolet rays is less than 50 mJ/cm², the composition cannot be fully cured. On the other hand, when the irradiance is in excess of 1,000 mJ/cm², there is such a possibility that the cured coating layer undergoes yellowing and degradation.

When the curing of the composition of the present invention is effected by the use of electron beam, a conventionally known electron beam irradiator can be used.

In this case, the irradiance of electron beam is preferably from 1 to 20 Mrad. When the irradiance of electron beam is less than 1 Mrad, the composition cannot be fully cured. On the other hand, when the irradiance is in excess of 10 Mrad, there is such a possibility that the cured coating layer or the substrate (paper, plastic sheet or film, or the like) is damaged, and degraded.

In the present invention, the average molecular weight of crosslinked molecules of the binder resins after reacted is generally in the range of 180 to 1,000, more preferably from 200 to 800, and most preferably from 250 to 500.

When the average molecular weight of crosslinked molecules is less than 180, the binder resin itself has lowered flexibility, so that the resulting coating layer tends to be cracked when the substrate is bent. On the other hand, when the average molecular weight of crosslinked molecules is in excess of 1,000, the binder resin itself becomes excessively soft, so that it cannot fully retain therein the spherical particles. The resulting coating layer is thus poor in scratch resistance.

The "average molecular weight of crosslinked molecules" as used herein means a value represented by $m/[2\times(f-1)]$, in which "f" is an average number of polymerizable functional groups contained in crosslinkable resins, and m is an average molecular weight of the crosslinkable resins.

Moreover, the average molecular weight of crosslinked molecules can also be represented by the following equation:

Average Molecular Weight of Crosslinked Molecules=Total Molecular Weight/Number of Crosslinked Points, wherein the total molecular weight is Σ

((number of moles of each component blended)×(molecular weight of each component)) and the number of crosslinked points is Σ[{(number of functional groups contained in each component−1)×2}×(number of moles of each component)].

The average molecular weights of crosslinked molecules obtained from the above two equations agree with each other.

The results of experiments carried out in order to examine the relationship between the abrasion resistance and the flexibility of a coating layer with the average molecular weight of crosslinked molecules of crosslinkable resins changed are shown in the below Table 1. The data shown in Table 1 were obtained in the following manner: urethane acrylate oligomer and two different types of acrylate monomers were used as the crosslinkable resins, and the average molecular weight of crosslinked molecules was adjusted by changing the blend ratio of these crosslinkable resins. A composition containing the crosslinkable resins, and, as the spherical particles, spherical alpha-alumina having an average particle diameter of 30 micrometers in an amount of 11 parts by weight for 100 parts by weight of the crosslinkable resins was coated onto a substrate in an amount of 25 g/m² to form a coating layer. The coating layer was cured, and the abrasion resistance and the flexibility of the cured coating layer were compared. The abrasion resistance test was carried out in accordance with JIS K6902, and the abrasion resistance was expressed in the number of tests carried out until the thickness of the resin layer was reduced to half. The flexibility of the crosslinkable resin layer after cured was rated according to the following standard:

⊚: the flexibility is very high;

○: the flexibility is good;

Δ: the flexibility is low; and

X: the flexibility is considerably low.

It is noted that in Experiment No. 6, conventional alpha-alumina with edges in an indeterminate form, having an average particle diameter of 30 micrometers was used, instead of the spherical particles, in the same amount as in Experiments 1 to 5. In the above-described resin system, although it is possible to vary the average molecular weight of crosslinked molecules between 180 and 1,000, a preferable range thereof is from 200 to 800. Further, when a flexible substrate is used, it is more preferable to use a resin system whose average molecular weight of crosslinked molecules is from 300 to 700. When such a resin system is used, a decorative material which is more excellent in both flexibility and abrasion resistance can be obtained.

TABLE 1

| Experiment No. | 1 | 2 | 3 | 4 | 5 | 6 |
|---|---|---|---|---|---|---|
| Average Molecular Weight of Crosslinked Molecules | 700 | 520 | 330 | 250 | 150 | 520 |
| Result of Abrasion Resistance Test | 500 | 800 | 1500 | 2500 | 3000 | 200 |
| Flexibility | ⊚ | ○ | ○ | Δ | x | ○ |

In order to use the composition of the present invention for coating, it is preferable that the viscosity of the composition be low from the operational point of view. The viscosity of the composition at an operating temperature is preferably 500 centipoises or lower, more preferably 200 centipoises or lower. When the viscosity of the composition is higher than 500 centipoises, the operating characteristics are poor, and there may be a case where a coating layer having a smooth surface cannot be obtained.

At the time when the composition of the present invention is used for coating, it is preferable to use, in order to control the viscosity of the composition, one or more solvents capable of dissolving therein the binder, having a boiling point at normal pressure of 70 to 150° C., in an amount of 40% by weight or less of the total amount of the components (A) and (B).

When the amount of the solvent(s) used is in excess of 40% by weight, the production efficiency is lowered, so that such an amount is unfavorable.

A solvent which is conventionally used in paints, inks or the like can be used as the above-described solvent. Specific examples of such a solvent include aromatic hydrocarbons such as toluene and xylene, ketones such as acetone, methyl ethyl ketone, methyl isobutyl ketone and cyclohexane, acetic acid esters such as ethyl acetate, isopropyl acetate and amyl acetate, alcohols such as methyl alcohol, ethyl alcohol and isopropyl alcohol, ethers such as dioxane, tetrahydrofuran and diisopropyl ether, and mixtures of two or more of these solvents.

Additives which are conventionally added to paints or inks, such as thermosetting catalysts, photopolymerization initiators, anti-foam agents, leveling agents and coupling agents can be further incorporated into the binder for use in the present invention, when necessary.

Examples of the thermosetting catalyst which is used in the present invention when the binder resin is alkyd or unsaturated polyester resin include peroxides such as tert-butyl peroxybenzoate, benzoyl peroxide and methyl ethyl ketone peroxide, and azo compounds such as azobisisobutyronitrile and azobisisovaleronitrile.

Examples of the thermosetting catalyst which is used in the present invention when the binder is epoxy resin include imidazoles such as 2-methyl-4-ethylimidazole, and phenols such as phenol, cresol and bisphenol A.

Examples of the thermosetting catalyst which is used in the present invention when the binder is two-pack urethane resin include dibutyltin dilaurate, tin octoate and triethylamine.

The amount of the thermosetting catalyst which is used when necessary is generally 10% by weight or less, preferably 5% by weight or less of the weight of the binder.

Preferable examples of the photopolymerization initiator which is used in the present invention when the binder resin is an ultraviolet-curing resin include benzoin alkyl ether, benzyldimethyl ketal, 1-hydroxycyclohexyl phenyl ketone, 2-hydroxy-2-methyl-1-phenylpropane-1-one, benzophenone, methyl benzoylformate and isopropyl thioxantone.

The amount of the photopolymerization initiator is generally 20% by weight or less, preferably 6% by weight or less of the weight of the binder.

Coloring agents such as dyes and pigments, known fillers such as flatting agents and bulk fillers, for example, $CaCo_3$, $BaSO_4$ and nylon resin beads, and other additives can also be added to the coating composition comprising the above-described crosslinkable resins as the binder, and the spherical particles.

Method of Coating

A method for forming an abrasion-resistant resin layer on the surface of a substrate by the use of the above-described coating composition will now be explained.

An abrasion-resistant resin layer can be formed either by a direct coating method (1) in which the coating composition is directly coated onto the surface of a substrate; or by a transfer coating method (2) in which after an abrasion-resistant resin layer is formed on the surface of a substrate having release properties, the resin layer is transferred to the surface of a desired substrate. In general, when a material into which the coating composition does not penetrate is used as the substrate, either one of the above-described methods (1) and (2) can be used. It is however preferable to adopt the above method (2) when a material into which the coating composition penetrates or which has a rough surface is used as the substrate, and to obtain a coating layer having a uniform thickness, or to evenly impart abrasion resistance to the coating layer by applying ionizing radiation of a uniform intensity.

Examples of the above-described direct coating method (1) include gravure coating, gravure reverse coating, gravure offset coating, spinner coating, roll coating, reverse roll coating, kiss-roll coating, wheeler coating, dip coating, solid coating by using a silk screen, wire bar coating, flow coating, comber coating, pour coating, brush coating and spray coating. Of these, gravure coating is preferred.

The transfer coating method (2) includes the following methods (a) to (d), in which a coating layer is firstly formed on a thin sheet (film) substrate, cured by crosslinking reaction, and then transferred to the surface of a desired substrate. The following means can be utilized to effect the transfer coating method; the lamination method ((a) or (b)) in which the coating layer formed by the coating composition is adhered, along with the thin substrate, to a three-dimensional object; or the transfer method (c) in which after a transfer sheet prepared by forming a coating layer, and, if necessary, an adhesive layer on a substrate sheet having release properties and curing the coating layer by crosslinking reaction is adhered to a three-dimensional object with the coating layer faced the surface of the object, only the substrate sheet is released from the transfer sheet. It is noted that any of the above-described direct coating methods can be employed when an abrasion-resistant resin layer is firstly formed on a thin sheet substrate in the transfer coating method.

(a) Injection molding-transfer method, as n Japanese Patent Publications Nos. 42080/1990 and 19924/1992; or injection molding-lamination method as disclosed in Japanese Patent Publication No. 19132/1975.

(b) Vacuum molding-transfer method as disclosed in Japanese Laid-Open Patent Publications Nos. 288214/1992 and 57786/1993; or vacuum molding-lamination method as disclosed in Japanese Patent Publication No. 45768/1981.

(c) Wrapping-transfer or wrapping-lamination method as disclosed in Japanese Patent Publications Nos. 51900/1984, 5895/1986 and 2666/1991.

(d) V-notch processing-lamination method as disclosed in Japanese Utility Model Publication No. 15-31155, or V-notch processing-transfer method as disclosed in Japanese Patent Publication No. 7866/1981.

A method comprising the following sequential steps (A) to (D) (described in Japanese Laid-Open Patent Publication No. 26673/1990) can also be used as one of the above-mentioned transfer coating methods (2) when an ionizing-radiation-curing resin is used as the crosslinkable resin:

(A) the step of coating a liquid ionizing-radiation-curing resin composition, which is not yet cured, onto a non-absorbent synthetic resin sheet having release properties;

(B) the step of laminating the resin sheet to a substrate with the coating layer formed by the ionizing-radiation-curing resin composition faced the surface of the substrate;

(C) the step of irradiating ionizing radiation to the coating layer formed by the ionizing-radiation-curing resin composition to cure the coating layer by crosslinking; and (D) the step of releasing the synthetic resin sheet.

In the case where an ionizing-radiation-curing resin diluted with a solvent is used in the above process, the step of evaporating the solvent is provided between the steps (A) and (B). According to the above process, even when a material having high permeability such as paper is used as the substrate, so-called "strike-through", a phenomenon that the resin goes through the substrate to the reverse side thereof, can be fully prevented, and an excellent abrasion-resistant resin layer can be easily formed on the surface of the substrate.

In the case where an ionizing-radiation-curing resin is used as the crosslinkable resin, the following ionizing-radiation irradiator is used for curing the resin: in order to irradiate ultraviolet rays, an irradiator having, as a light source, an ultra-high-pressure mercury vapor lamp, a high-pressure mercury vapor lamp, a low-pressure mercury vapor lamp, carbon arc, a black-light lamp, a metallic halide lamp or the like is used; and in order to irradiate electron beam, any of various electron beam accelerators such as a Cockcroft-Walton accelerator, a van de Graaff accelerator, a resonant-transformer-type accelerator, an insulating-core-transformer-type accelerator, and a linear, dynamitron or high-frequency accelerator is used. When electron beam is irradiated, electrons with an energy of, in general, 100 to 1,000 keV, preferably 100 to 300 keV are irradiated in an irradiated of approximately 0.1 to 30 Mrad.

Further, when a thermosetting resin is used as the crosslinkable resin, the coating composition can be heated after the step of coating in order to accelerate the curing reaction of the thermosetting resin. In general, the heating time is approximately 1 to 5 days at 40 to 60° C. when isocyanate-curing unsaturated polyester resin or polyurethane resin is used, and approximately 1 to 300 minutes at 80 to 150° C. when polysiloxane resin is used.

The decorative material of the present invention can be composed only of the substrate and the abrasion-resistant resin layer formed thereon. However, it is also possible to provide a pattern on the surface of the substrate, and to form the abrasion-resistant resin layer on the patterned surface. The pattern can be provided by means of printing, using a printing ink containing a vehicle to which known colorants such as pigments or dyes, extender pigments, solvents, stabilizers, plasticizers, catalysts and curing agents are suitably added, if necessary. A resin having required physical properties and printability, suitably selected from thermoplastic, thermosetting and ionizing-radiation-curing resins and the like is used as the above-described vehicle. Further, any of those organic or inorganic pigments which are conventionally used can be employed as the pigment. A liquid solvent which can dissolve or disperse therein the resin used as the vehicle, the coloring agents such as pigments and other additives and which has proper drying characteristics is used as the solvent for dilution. In general, it is preferable, from the viewpoint of solubility, to select a liquid solvent whose solubility parameter is almost equal to that of the vehicle. A pattern (for example, a pattern of wood grain, texture, figures, letters or the like) can be provided on the surface of the substrate either partially or entirely. For example, when it is required to emphasize a certain part of a pattern (for example, a glossy part of a wood grain pattern), the pattern is provided partially. In order to entirely give a pearly appearance or Moire pattern, a solid pattern is provided entirely.

Further, it is also possible to carry out the following procedure in the present invention: a resin layer is provided on the surface of a substrate, and a desired pattern is provided by forming indentations in the surface resin layer; the indentations formed in the surface resin layer are filled with a conventional coloring ink by means of wiping to form a wiped-ink layer; and an abrasion-resistant resin layer is then formed on top of the wiped-ink layer. Furthermore, it is also possible to directly provide the pattern-wise indentations and wiped-ink layer on the surface of the substrate.

The following process is used for forming a wiped-ink layer, which is a layer of a coloring ink filled in indentations, in the production of a decorative material. Namely, after a coating composition containing a coloring ink is coated onto the entire surface of a substrate having a surface resin layer in which an embossed pattern has been provided by a conventional embossing technique, the surface of the surface resin layer coated with the coating composition is wiped by a doctor blade, an air knife, a roller whose surface is covered with sponge, or the like, whereby the coating composition deposited on the projected parts of the embossed pattern is removed, and a coloring ink layer is thus formed by the ink remaining only in the indentations. Since a colored coating composition is used in this wiping process, the vessels of wood grain can be excellently reproduced when a pattern of wood grain is provided by forming indentations. In this case, a transparent resin is used for forming the surface resin layer.

The decorative material of the present invention, having abrasion resistance can be used for various purposes; for instance, it is useful for decorating the surfaces of buildings, vehicles, ships, furnitures, musical instruments, cabinets and the like, and also for decorating wrapping materials. The decorative material of the present invention is particularly suitable in the fields where abrasion resistance is required. When the decorative material of the present invention is applied to the above-described uses, it can be laminated on the surface of any of the above objects to be decorated by one of various means such as the methods (a) to (d), which have been previously described in order to explain the transfer coating method.

The present invention will now be explained more specifically by referring to the following examples. However, the present invention is not limited by these examples. In the examples, the unit "part(s)" means "part(s) by weight".

Example 1

| | |
|---|---|
| Bisphenol A epoxy resin ["Epicoat 828" manufactured by Yuka Shell Epoxy Kabushiki Kaisha] | 70 parts |
| 1,6-Hexamethylene glycol diglycidyl ether ["SR-16H" manufactured by Sakamoto Yakuhin Kogyo, Co., Ltd.] | 14 parts |
| Spherical alumina having an average particle diameter of 30 micrometers and a Knoop hardness of 2,800 ["Alumina Beads CB-A30S" manufactured by Showa Denko K.K.] | 15 parts |
| Thixotropic agent ["Aerosil 200" manufactured by Nippon Aerosil Co., Ltd.] | 0.5 parts |
| Anti-settling agent ["Orben" manufactured by Shiraishi Kogyo Kaisha, Ltd.] | 0.5 parts |

The above components were uniformly mixed by a planetary mixer. The resulting mixture is referred to as "Base 1". 17 parts of m-xylylene diamine and 20 parts of toluene were uniformly mixed with 100 parts of Base 1. The viscosity of the resulting mixture was 400 centipoises.

This mixture was coated onto printed paper to form a coating layer so that the thickness of the coating layer would be 25 micrometers when dried. The coating layer was then cured at 40° C. for 20 minutes. Taber abrasion test was carried out for this coated paper in accordance with JIS K-6902. As a result, the abrasion loss at a number of revolutions of 200 was 30 mg.

Production Example 1

In a glass reactor equipped with a dropping funnel, a thermometer, a reflux condenser and a stirring rod, 1,000 parts of polytetramethylene glycol having a molecular weight of 1,000 and 444 parts of isophorone diisocyanate were charged, and reaction was carried out at 120° for 3 hours. The reaction mixture was then cooled to a temperature of 80° C. or lower. To this mixture was added 232 parts of 2-hydroxyethyl acrylate, and reaction was carried out at 80° C. until the isocyanate group disappeared. The product of this reaction is referred to as "Urethane acrylate 1".

Example 2

| | |
|---|---|
| Urethane acrylate 1 | 20 parts |
| Bisphenol A $(EO)_4$ diacrylate | 20 parts |
| Phenol $(EO)_2$ acrylate | 20 parts |
| Spherical alumina having an average particle diameter of 30 micrometers and a Knoop hardness of 2,800 ["Alumina Beads CB-A30S" manufactured by Showa Denko K.K.] | 15 parts |
| Photopolymerization initiator ["Darocure 1173" manufactured by Merck] | 3 parts |
| Thixotropic agent ["Aerosil 200" manufactured by Nippon Aerosil Co., Ltd.] | 0.5 parts |
| Toluene | 5 parts |

The above components were uniformly mixed. The viscosity of the mixture was 440 centipoises. The average molecular weight of crosslinked molecules of the reactive resins was 272. The mixture was coated onto printed paper to form a coating layer so that the thickness of the coating layer would be 25 micrometers when dried, and 150 mJ/cm$^2$ of ultraviolet rays were irradiated to the coating layer. Taber abrasion test was carried out for this coated paper in the same manner as in Example 1. As a result, the abrasion loss was 25 mg.

Example 3

| | |
|---|---|
| Urethane acrylate 1 | 20 parts |
| Trimethylolpropane triacrylate | 20 parts |
| Bisphenol A (EO)$_4$ diacrylate | 10 parts |
| Phenol (EO)$_2$ acrylate | 30 parts |
| Spherical alumina having an average particle diameter of 30 micrometers and a Knoop hardness of 2,800 ["Alumina Beads CB-A20S" manufactured by Showa Denko K.K.] | 15 parts |
| Thixotropic agent ["Aerosil 200" manufactured by Nippon Aerosil Co., Ltd.] | 0.5 parts |

The above components were uniformly mixed. The viscosity of the mixture was 740 centipoises. The average molecular weight of crosslinked molecules of the reactive resins was 287. The mixture was coated onto printed paper to form a coating layer so that the thickness of the coating layer would be 20 micrometers when dried, and 3 Mrad of electron beam was irradiated to the coating layer. Taber abrasion test was carried out for this coated paper in the same manner as in Example 1. As a result, the abrasion loss was 18 mg.

Example 4

| | |
|---|---|
| Urethane acrylate 1 | 14 parts |
| Pentaerythritol triacrylate | 10 parts |
| Bisphenol A (EO)$_4$ diacrylate | 30 parts |
| Neopentyl glycol (PO)$_2$ diacrylate | 12 parts |
| 2-Hydroxy-3-phenoxypropyl acrylate | 11 parts |
| 2-Acryloyloxyethyl phosphate | 1 part |
| Bis(methacryloxypropyl)poly(dimethylsiloxane) | 3 parts |
| Spherical alumina having an average particle diameter of 25 micrometers and a Knoop hardness of 2,800 ["Harimick AX-25" manufactured by Micron Co., Ltd.] | 22 parts |
| Thixotropic agent ["Aerosil 200" manufactured by Nippon Aerosil Co., Ltd.] | 0.5 parts |
| Ethyl acetate | 10 parts |

The above components were uniformly mixed. The viscosity of the mixture was 440 centipoises.

The mixture was coated onto printed paper to form a coating layer so that the thickness of the coating layer would be 25 micrometers when dried, and 5 Mrad of electron beam was irradiated to the coating layer. Taber abrasion test was carried out for this coated paper in the same manner as in Example 1. As a result, the abrasion loss was 15 mg.

Comparative Example 1

| | |
|---|---|
| Urethane acrylate 1 | 20 parts |
| Trimethylolpropane triacrylate | 20 parts |
| Bisphenol A (EO)$_4$ diacrylate | 20 parts |
| Phenol (EO)$_2$ acrylate | 20 parts |
| Photopolymerization initiator ["Darocure 1173" manufactured by Merck] | 3 parts |
| Thixotropic agent ["Aerosil 200" manufactured by Nippon Aerosil Co., Ltd.] | 0.5 parts |
| Toluene | 5 parts |

The above components were uniformly mixed. The viscosity of the mixture was 400 centipoises.

The mixture was coated onto printed paper to form a coating layer so that the thickness of the coating layer would be 25 micrometers when dried, and 150 mJ/cm$^2$ of ultraviolet rays were irradiated to the coating layer. Taber abrasion test was carried out for this coated paper in the same manner as in Example 1. As a result, the coating layer was completely abraded, and even the substrate was found to be worn away.

Comparative Example 2

| | |
|---|---|
| Urethane acrylate 1 | 20 parts |
| Trimethylolpropane triacrylate | 20 parts |
| Bisphenol A (EO)$_4$ diacrylate | 10 parts |
| Phenol (EO)$_2$ acrylate | 30 parts |
| Thixotropic agent ["Aerosil 200" manufactured by Nippon Aerosil Co., Ltd.] | 0.5 parts |

The above components were uniformly mixed. The viscosity of the mixture was 720 centipoises.

The mixture was coated onto printed paper to form a coating layer so that the thickness of the coating layer would be 20 micrometers when dried, and 3 Mrad of electron beam was irradiated to the coating layer. Taber abrasion test was carried out for this coated paper in the same manner as in Example 1. As a result, the coating layer was completely abraded, and even the substrate was found to be worn away.

Comparative Example 3

| | |
|---|---|
| Urethane acrylate 1 | 14 parts |
| Pentaerythritol triacrylate | 10 parts |
| Bisphenol A (EO)$_4$ diacrylate | 30 parts |
| Neopentyl glycol (PO)$_2$ diacrylate | 12 parts |
| 2-Hydroxy-3-phenoxypropyl acrylate | 11 parts |
| Bis(methacryloxypropyl)poly(dimethylsiloxane) | 3 parts |
| Thixotropic agent ["Aerosil 200" manufactured by Nippon Aerosil Co., Ltd.] | 0.5 parts |
| Ethyl acetate | 10 parts |

The above components were uniformly mixed. The viscosity of the mixture was 400 centipoises.

The mixture was coated onto printed paper to form a coating layer so that the thickness of the coating layer would be 25 micrometers when dried, and 5 Mrad of electron beam was irradiated to the coating layer. Taber abrasion test was carried out for this coated paper in the same manner as in Example 1. As a result, the coating layer was completely abraded, and even the substrate was found to be worn away. In the decorative material according to the present invention, the coating layer is formed by using a composition prepared by adding a specific amount of spherical particles whose average particle diameter is in a specific range to crosslinkable resins, and the relationship between the average thickness of the coating layer and the average particle diameter of the spherical particles is also specified. The coating layer is therefore excellent in both scratch resistance and flexibility, and the decorative material having the coating layer is excellent in surface transparency and surface smoothness. The decorative material of the present invention is scarcely damaged by abrasion or scratch, and is flexible, so that the coating layer is not cracked even when the substrate is bent. In addition, the decorative material of the invention also has a good appearance.

We claim:

1. A decorative material comprising:

a substrate; and an abrasion-resistant coating layer formed on said substrate, said abrasion-resistant coating layer comprising spherical inorganic particles (A) having an average particle diameter of 3 to 50 micrometers and a Knoop hardness of at least 1,300 kg/mm², and a binder (B) comprising a crosslinkable resin comprising at least 10% by weight of a polyether urethane (meth) acrylate represented by the following general formula (2):

$$CH_2=C(R^1)-COOCH_2CH_2-OCONH-X-NHCOO-[-CH(R^2)-(CH_2)_n-O-]_m-CONH-X-NHCOO-CH_2CH_2OCOC(R^1)=CH_2 \quad (2)$$

wherein $R^1$ and $R^2$ each represent hydrogen or a methyl group, X is a diisocyanate radical, n is an integer of 1 to 3, and m is an integer of 6 to 60, the average molecular weight of crosslinked molecules of said binder (B) after curing being from 200 to 800, the amount of said spherical particles (A) being from 5% to 50% by weight of the total amount of the components (A) and (B), the hardness of said spherical particles (A) being higher than that of said binder (B), the average particle diameter d, in micrometers, of said spherical particles (A) fulfilling the following inequality (1):

$$0.3t \leq d \leq 3.0t \quad (1)$$

wherein t is an average thickness, in micrometers, of said coating layer.

* * * * *